United States Patent [19]

Tsujihara et al.

[11] 4,072,315
[45] Feb. 7, 1978

[54] TURNTABLE DIRECT-DRIVE SYSTEM

[75] Inventors: Toshio Tsujihara, Kobe; Humitoshi Saito, Kyoto; Teruaki Kitamori, Hirakata, all of Japan

[73] Assignee: Matsushita Electric Industrial Co., Ltd., Japan

[21] Appl. No.: 672,002

[22] Filed: Mar. 30, 1976

[30] Foreign Application Priority Data

Apr. 7, 1975 Japan .................................. 50-42644
Apr. 7, 1975 Japan .................................. 50-47541
Nov. 6, 1975 Japan .................................. 50-151482
Nov. 6, 1975 Japan .................................. 50-151483
Nov. 6, 1975 Japan .................................. 50-151484

[51] Int. Cl.² .................. G11B 17/00; G11B 3/60; H02K 1/22
[52] U.S. Cl. .................. 274/1 E; 274/39 A; 310/266
[58] Field of Search ............. 274/1 E, 39 A; 310/266

[56] References Cited

U.S. PATENT DOCUMENTS

| 1,419,749 | 6/1922 | Murphy | 274/1 E |
| 1,580,037 | 4/1926 | Hall | 274/1 E |
| 1,917,633 | 7/1933 | Burt | 274/39 A |
| 3,870,321 | 3/1975 | Smith et al. | 274/39 A |

Primary Examiner—Steven L. Stephan
Attorney, Agent, or Firm—Burgess, Ryan and Wayne

[57] ABSTRACT

A turntable direct-drive system in which a cylindrical rotor having an inverted U-shaped cross sectional configuration is carried by a turntable shaft, and two stator cores with windings mounted thereupon are disposed at opposite sides, respectively, of the side wall of the cylindrical rotor and spaced apart therefrom by a distance suitable to exert the driving force to the side wall of the cylindrical rotor. A turntable is supported by the turntable shaft or on the top of the cylindrical rotor directly or through a plurality of projections extended therefrom or a plurality of elastic supporting members attached thereto so that the turntable may be maintained at a level and vibrations thereof may be minimized.

6 Claims, 11 Drawing Figures

TURNTABLE DIRECT-DRIVE SYSTEM

BACKGROUND OF THE INVENTION

The present invention relates to a turntable direct-drive system of the type employing a phono-motor having stators placed at the opposite sides of the side wall of a cylindrical rotor.

The turntable direct-drive system in accordance with the present invention may be incorporated in audio recording and/or reproducing systems, especially such as a disk player or magnetic tape recorder.

In the conventional disk players or magnetic tape recorders in which a drive motor is operatively coupled to a turntable through mechanical coupling means such as a belt or idler, wear or deformation of mechanical coupling means causes the fluctuation in rotation of a turntable and adversely affects the performance. To overcome this problem, there has been devised and demonstrated a turntable direct-drive system in which an AC induction motor or DC brushless motor is directly coupled to a turntable shaft. However, a AC induction motor causes vibrations while a DC brushless motor causes the fluctuation in rotational speed of a turntable. Furthermore, a cylindrical rotor is formed integrally with a turntable so that when the turntable is mounted on a turntable shaft, there is a possibility that the shaft and a bearing well for receiving the shaft tend to be subjected to deformations during the shipment. To avoid this problem, the turntable must be detached from the shaft during the shipment. Since the cylindrical rotor which is formed integrally with or attached to the underside of the turntable is very thin, special packing and crating methods must be employed in order to prevent the damage to the cylindrical rotor, thus resulting in the high shipment cost. Furthermore, when the turntable is reassembled by an unskilled user, the thin-wall cylindrical rotor tends to be damaged or deformed.

SUMMARY OF THE INVENTION

In view of the above, one of the objects of the present invention is to provide a turntable direct-drive system which may reduce the vibrations and fluctuation in rotation to the minimum.

Another object of the present invention is to provide a turntable direct-drive system which is free from mechanical damages so that the shipment may be much facilitated.

A further object of the present invention is to provide a turntable direct-drive system in which a turntable and a cylindrical rotor of a drive motor are provided as discrete components.

A further object of the present invention is to provide a turntable direct-drive system using an AC induction motor of the type in which stator cores with windings mounted thereupon are placed at opposite sides of the side wall of a cylindrical rotor and spaced apart thereform by a distance sufficient to exert the driving force to the side wall of the rotor.

A further object of the present invention is to provide a turntable direct-drive system using a cylindrical rotor which may be advantageously mass produced by drawing a thin sheet of non-magnetic, electrically conductive material such as copper or aluminum.

A further object of the present invention is to provide a turntable direct-drive system in which a cylindrical rotor which may be mass produced in a simple manner by drawing a thin sheet of non-magnetic, electrically conductive material such as copper or aluminum is used so that vibrations of a turntable may be minimized and that the damage to the cylindrical rotor may be prevented during the shipment or reassembly.

A further object of the present invention is to provide a turntable direct-drive system whose excellent performance may be ensured over a long period.

A further object of the present invention is to provide a turntable direct-drive system in which a cylindrical rotor which is formed by drawing a thin sheet 0.2 to 4.0 mm in thickness of non-magnetic, electrically conductive material such as aluminum or copper is carried by a turntable shaft, stator cores with windings mounted thereupon are positioned at opposite sides, respectively, of the side wall of the cylindrical rotor and spaced apart therefrom by a suitable distance for exerting the driving force thereto, and a turntable is supported by the shaft at the tapered portion thereof or on the top surface of the cylindrical rotor directly or through a plurality of elastic supporting members so that the turntable may be rotated in unison with the cylindrical rotor.

To the above and other ends, the present invention provides a turntable direct-drive system wherein a cylindrical rotor is carried by a turntable shaft, stator cores with windings mounted thereupon are positioned at opposite sides of the side wall of the cylindrical rotor and spaced apart therefrom by a distance sufficient for exerting the driving force thereto, and a turntable is supported on the top surface of the cylindrical rotor directly or through a plurality of elastic supporting means.

BRIEF DESCRIPTION OF THE DRAWING

Same reference numerals are used to designate similar parts throughout the figures.

DESCRIPTION OF THE PREFREERED EMBODIMENTS

Figure 1:
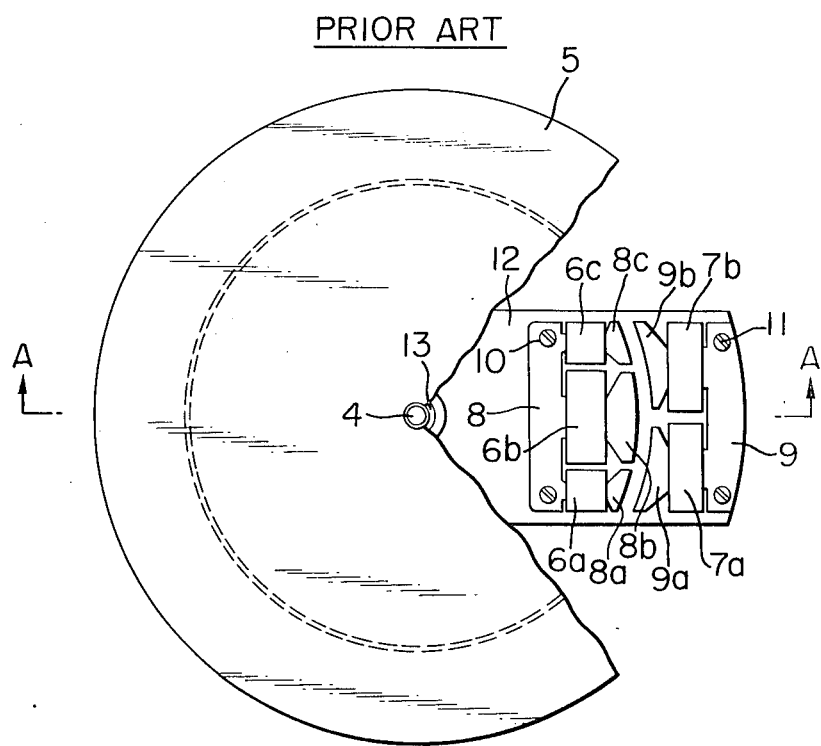
FIG. 1 is a top view of a prior art turntable direct-drive system with a turntable partly broken away to show components below the turntable.
Figure 2:
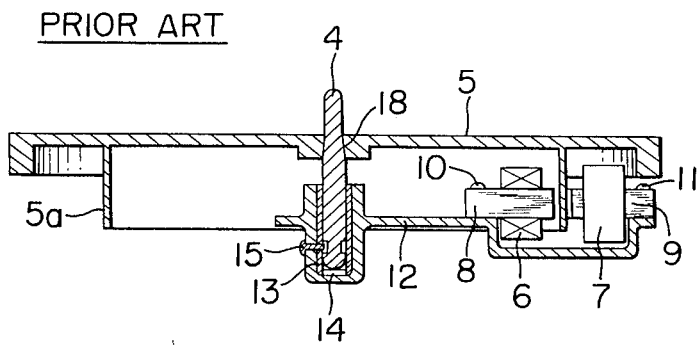
FIG. 2 is a sectional view thereof taken along the line A—A of FIG. 1.

Prior Art, FIGS. 1 and 2

FIG. 1 is a top view, partly broken, of a prior art turntable direct-drive system while FIG. 2 is a sectional view thereof. A turntable 5 which is made of a non-magnetic, electrically conductive material such as copper, aluminum or the like and is formed integral with a cylindrical conductor or rotor 5a is supported by a turntable shaft 4 at the tapered portion 18 thereof. Stator cores 8 and 9 are located at opposite sides of the skirt or side wall of the cylindrical conductor 5a and are spaced apart from each other with the air gap. The first stator core 8 has three poles 8a, 8b and 8c with windings 6a, 6b and 6c, respectively, and the second stator core 9 has two poles 9a and 9b with windings 7a and 7b, which poles are out of phase with respect to the poles 8a, 8b and 8c of the first stator core 8. The windings 7a and 7b are connected to phase-advancing capacitors (not shown). The first and second stator cores 8 and 9 are mounted on a base 12 with screws 10 and 11. The base 12 has a bearing well 13 and a bearing seat 14, and the spindle 4 is received in the bearing well 13 and securely locked in position with a screw 15. When the windings on the first and second stator cores 8 and 9 are energized, the driving force is exerted to the cylindrical conductor 5a in the air gap between the first and second stator cores 8 and 9 so that the cylindrical conductor 5a and hence the turntable 5 are rotated.

In case of the shipment of the direct-drive system of the type described, the turntable 5 is detached from the shaft 4 in order to prevent the deformation of the shaft 4 and the bearing well 13 by impacts. However, the cylindircal conductor 5a which is formed integral with the turntable 5 is in general 1 millimeter in thickness. Therefore, in order to prevent the deformation of the cylindrical conductor 5a during the shipment, special packing and crating methods must be employed, resulting in the high shipment cost. Furthermore, there is a possibility that the cylindrical conductor 5a is deformed when the turntable 5 is mounted on the shaft 4 in re-assembly.

Figure 3:
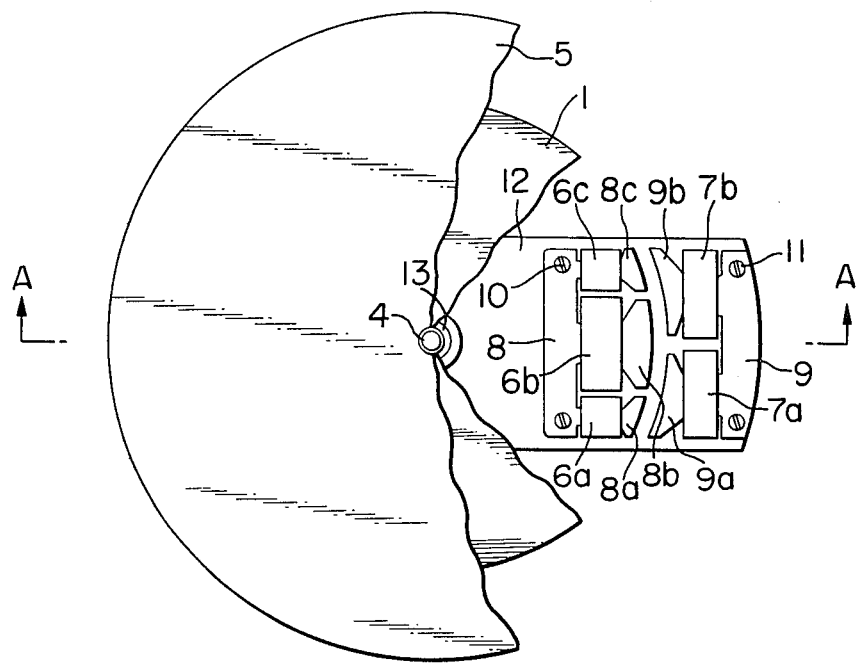
FIG. 3 is a view similar to FIG. 1, but shows a first embodiment of a turntable direct-drive system in accordance with the present invention.
Figure 4:
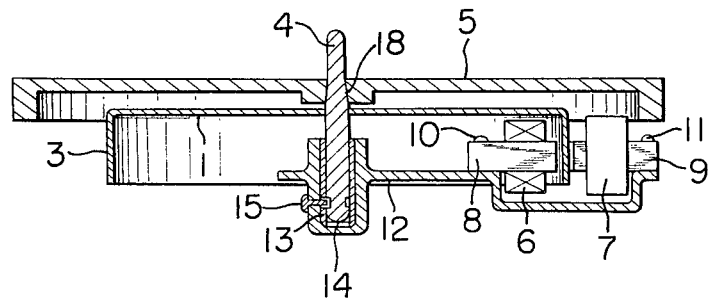
FIG. 4 is a sectional view taken along the line A—A of FIG. 3.

First Embodiment, FIGS. 3 and 4

In the first embodiment of the present invention shown in FIGS. 3 and 4, a cylindrical rotor 1 is made as a discrete component physically independent of the turntable 5, and the driving force is exerted on the skirt or side wall 3 of the cylindrical rotor 1. The stator cores 8 and 9 for exerting the driving force to the cylindircal rotor 1 and the arrangement for supporting the turntable 5 are substantially similar in construction to the prior art shown in FIGS. 1 and 2, so that no further explanation shall be made in this specification.

According to the first embodiment, the cylindrical rotor 1 is provided as a discrete component so that it is considerably lighter in weight than the rotor formed integrally with the turntable. Therefore, the deformation of the bearing well 13 and the bearing seat 14 may be prevented even when the cylindrical rotor 1 is mounted on the shaft 4 in case of the shipment. Furthermore, the deformation of the cylindrical rotor 1 itself may be prevented because it is mounted on the shaft 4. Furthermore, in re-assembly the turntable 5 is mounted on the shaft 4 without the cylindrical rotor 1 being detached therefrom so that the deformation of the latter may be completely prevented.

Figure 5:
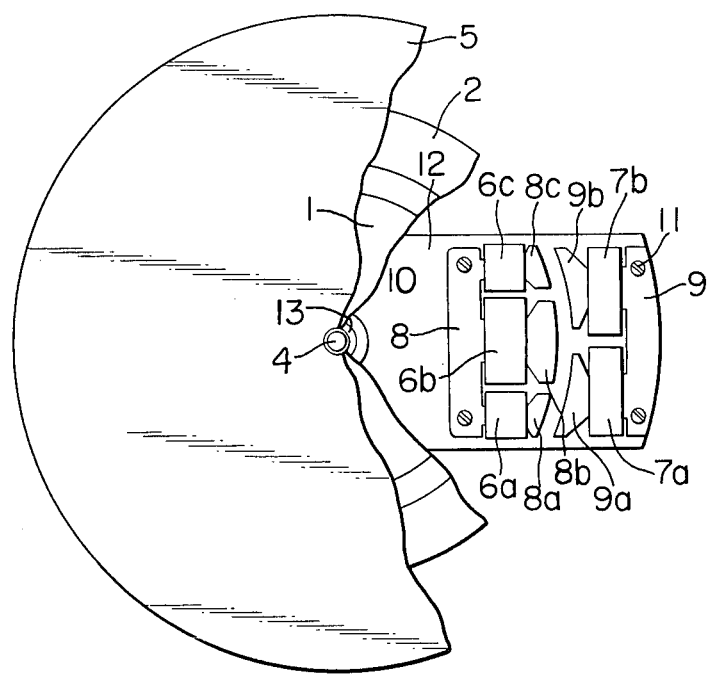
FIG. 5 is a top view of a second embodiment of the present invention with a turntable being partly broken away to show some components below the turntable.
Figure 6:
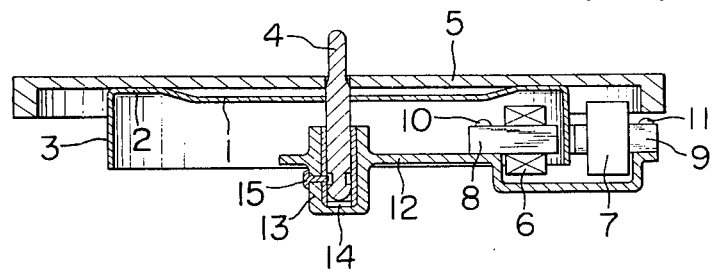
FIG. 6 is a sectional view thereof.

Second Embodiment, FIGS. 5 and 6

In the second embodiment shown in FIGS. 5 and 6, the turntable 5 is supported on an annular raised rim portion 2 of the top of the inverted U-shaped cylindrical rotor 1 and is rotated in unison with the cylindrical rotor 1.

Figure 7:
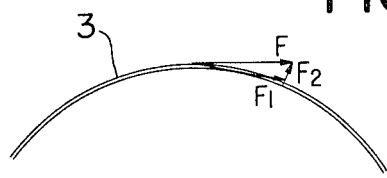
FIG. 7 is a diagram used for the explanation of vibrations of the cylindrical rotor caused by the radial component of the driving force exerted thereto.

As shown in FIG. 7, the first and second stator cores 8 and 9 exert the driving force F to the side wall of the cylindrical rotor 1. The driving force F is resolved into the force $F_1$ which causes the cylindrical rotor 1 to rotate and the force $F_2$ acting on the shaft 4 in the radial direction. The radial force $F_2$ fluctuates in magnitude at a frequency twice as high as the frequency of the power supply, causing vibration of the cylindrical rotor 1. However, according to the present invention the radial force $F_2$ may be sufficiently damped as the turntable 5 is supported on the annular raised rim portion 2 of the cylindrical rotor 1.

Next the reason why the vibration due to the radial force $F_2$ may be sufficiently damped will be described in more detail hereinafter. The radial force $F_2$ is given by $$F_2 = F_0 \cdot \sin \omega t$$

where
$\omega = 2\pi \times 2f,$
$f$ = frequency of power supply to the windings on the stator cors, and
$F_0$ = maximum value of $F_2$.

Figure 8:
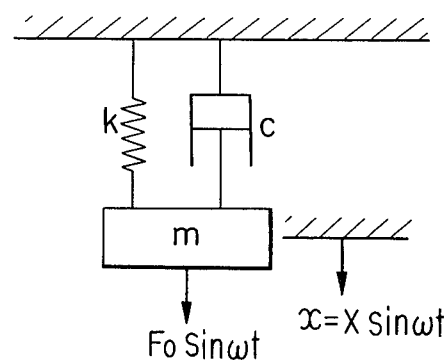
FIG. 8 shows an oscillating system of the second embodiment.

The cylindrical rotor is subjected to the forced vibration with one degree of freedom. The oscillating system of the rotor is shown in FIG. 8. The equation describing this system is $$m \, d^2x/dt^2 + c \, dx/dt + kx = F_0 \cdot \sin \omega t \qquad (1)$$

where
$m$ = mass of rotor,
$k$ = spring constant, and
$c$ = friction coefficient of dashpot.

Solving Eq. (1) for X which is the amplitude in the steady state, we have $$X = F_0/\sqrt{(K-m\omega^2)^2 + (c\omega)^2} \qquad (2)$$

If the damping due to a dashpot is negligible, Eq. (2) may be reduced to $$X = F_0/|k - m\omega^2| \qquad (3)$$

The natural frequency of the direct-drive system in accordance with the present invention is 40 to 70 Hz, and $\omega/\omega_n > 1.0$, where $\omega_n = 2\pi f_n$. Therefore, Eq. (3) shows that if the mass $m$ is increased, the amplitude X may be reduced because $m\omega^2 > k$.

In the second embodiment, mounting the turntable on the cylindrical rotor is increasing the mass of the cylindrical rotor 1 so that the vibration due to the radial force $F_2$ may be sufficiently damped. Since the mass of the turntable 5 is considerably greater than the mass of the cylindrical rotor 1, the variation in mass of the cylindrical rotor 1 will not cause a greater change in vibration. Therefore, the cylindrical rotor 1 may be made light in weight, and may be formed by drawing a sheet 0.2 mm to 4.0 mm in thickness of non-magnetic, electrically conductive material such as aluminum or copper. From the consideration of the length of the air gap between the first and second stator cores 8 and 9 and the mechanical strength sufficient to support the turntable 5, the thickness of the cylindrical rotor 1 is preferably 0.8 mm to 1.2 mm.

Table 1 below shows the comparison between S/N ratios when the turntable was supported on the cylindrical rotor formed by drawing a sheet 1.0 mm in thickness of aluminum and when the turntable was supported on the shaft at the tapered portion thereof as shown in FIG. 2.

Table 1

| turntable supporting method | S/N ratio in case of vibration due to radial force $F_2$ |
| --- | --- |
| turntable supported by spindle alone | -48 dB |
| turntable supported on rotor | -60 dB |

It is readily seen that when the turntable is supported on the cylindrical rotor, S/N ratio is reduced to ¼ of S/N ratio encountered when the turntable is supported by the shaft alone.

Figure 9:
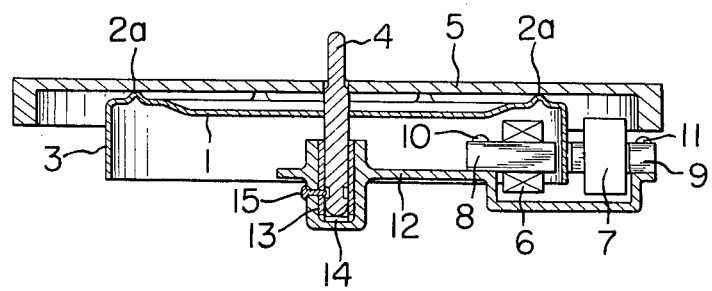
FIGS. 9, 10 and 11 are sectional views of further embodiments or modifications of the present invention.

When the cylindrical rotor 1 is formed by drawing, its top surface is distorted; that is, not flat so that the turntable supported on the distored top surface of the rotor is subjected to vibration; that is, the turntable is not maintained at a level. This problem may be overcome by the third embodiment of the present invention shown in FIG. 9. A plurality of coaxial projections 2a are formed coaxially of the axis of rotation of the rotor 1 adjacent to the periphery of the top surface thereof. It is preferable to machine the top surface of the projections 2a after the rotor 1 is attached to the turntable shaft 4.

Figure 10:
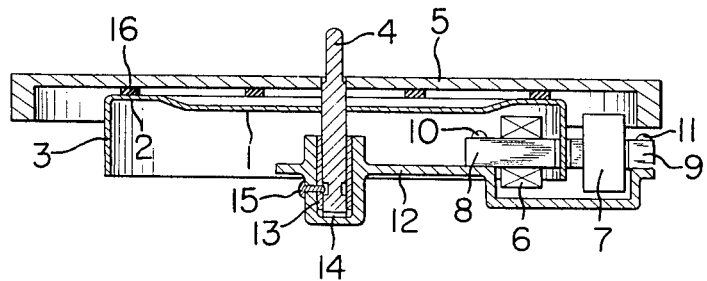

FIG. 10 shows a modification of the first embodiment shown in FIGS. 3 and 4, and is different thereform in that the turntable 5 is supported on a plurality of elastic supporting pads made of rubber or springs placed on the top surface of the cylindrical rotor 1 adjacent to the periphery thereof.

As described above, the top surface of the cylindrical rotor 1 which is made by drawing is not flat so that the underside of the turntable 5 cannot be made in complete contact with the top surface of the rotor 1 and consequently the turntable 5 is not supported in a stable manner. As a result, chatter noise is produced, and the turntable 5 slips over the rotor 1 when the turntable is started or restrained during its rotation. However, according to this modification the turntable 5 is supported on the elastic supporting pads or springs so that the turntable 5 may be maintained at a level in a reliable manner, the chatter noise may be eliminated, and the slipping of the turntable may be prevented. Furthermore, the transmission of vibrations of the rotor 1 may be prevented by the elastic supporting pads or springs 16 so that vibration of the turntable 5 may be further reduced.

Figure 11:
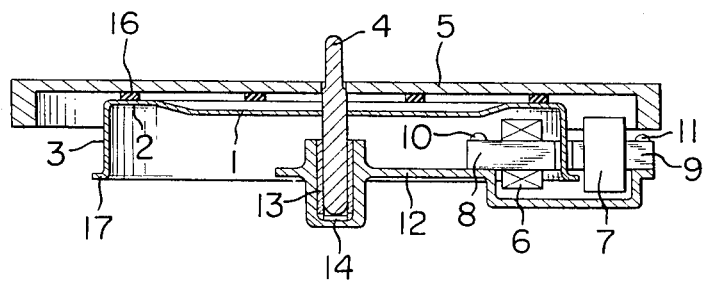

FIG. 11 shows a modification of the direct-drive system shown in FIG. 10. The lower edge 17 of the side wall 3 of the cylindrical rotor 1 is extended outwardly radially. In assembly, the first stator core 8 with the winding 6 is mounted on the base 12 and securely held thereto with the screws 10, and then the spindle shaft 4 supporting the cylindrical rotor 1 is inserted into the bearing well 13. Thereafter, the second stator core 9 with the winding 7 is mounted on the base 12 and securely held thereto with the screws 11.

According to this modification, the outwardly radially extended flange 17 of the cylindrical rotor 1 is placed immediately below the second stator core 9, so that the shaft 4 may be prevented from being pulled out of the bearing well 13. Therefore, the setting screw 15 (See FIG. 2) may be eliminated. The elimination of the setting screw 15 is very important because no screw hole is tapped through the bearing well 13 and consequently the lubricating oil leakage through such screw hole may be completely eliminated. Therefore, the satisfactory performance of the direct-drive system may be ensured over a long period. In addition, the provision of the flange 17 results in not only the increase in mechanical strength of the cylindrical rotor 1 but also the decrease of vibrations thereof.

What is claimed is:

1. In a turntable direct drive system comprising:

a base;

a vertical turntable shaft extending upwardly from said base;

rotatable means having a horizontal surface portion and a downwardly extending cylindrical peripheral lip, said means being mounted on said shaft and including a turntable surface adjacent said horizontal surface portion;

a first stator core with a drive winding thereon adjacent said base within said peripheral lip and spaced a first predetermined distance from said lip; and a second stator core with a drive winding thereon adjacent said base outside said peripheral lip in juxtaposition with said first stator core and spaced a second predetermined distance from said lip, said stator cores and windings cooperating to be adapted to exert a driving force on said peripheral lip to cause said rotatable means to rotate about the axis of said shaft;

the improvement wherein said rotatable means comprises (i) a cylindrical rotor of non-magnetic electrically conductive material having said horizontal surface portion and cylindrical lip, said rotor lip having an outwardly extending edge protruding from the bottom of said lip and extending beneath a portion of said second stator core to prevent movement of said rotor away from said base, (ii) a separate turntable coupled to said rotor for rotation therewith, said turntable being spaced apart from a major part of said horizontal surface portion of said rotor, said turntable having said turntable surface, the weight of said rotor being substantially less than the weight of said turntable, and (iii) coupling means between said rotor and said turntable for providing a rotational force to said turntable while isolating said turntable from vibrations of said rotor and from warping forces due to any warped condition of said rotor.

2. A turntable direct-drive system as set forth in claim 1 wherein said cylindrical rotor comprises a sheet 0.2 to 4.0 mm in thickness of a non-magnetic, electrically conductive material.

3. A turntable direct-drive system as set forth in claim 1 wherein said turntable is supported by a plurality of elastic supporting members placed on said horizontal surface portion of said cylindrical rotor adjacent the periphery thereof.

4. The improvement according to claim 1, wherein said turntable shaft comprises said coupling means.

5. The improvement according to claim 1, wherein said turntable is freely supported on an annular raised rim part formed at the periphery of said horizontal surface portion of said rotor.

6. The improvement according to claim 5, further comprising resilient material disposed between said turntable and said rim part.

* * * * *

UNITED STATES PATENT OFFICE
CERTIFICATE OF CORRECTION

Patent No. 4,072,315   Dated February 7, 1978

Inventor(s) Toshio Tsujihara, et al

It is certified that error appears in the above-identified patent and that said Letters Patent are hereby corrected as shown below:

Column 3, line 24: "cylindircal" should be --cylindrical--.

line 40: "cylindircal" should be --cylindrical--.

Column 5, line 26: "thereform" should be --therefrom--.

Signed and Sealed this

Twenty-fifth Day of July 1978

[SEAL]

Attest:

RUTH C. MASON
Attesting Officer

DONALD W. BANNER
Commissioner of Patents and Trademarks